Nov. 27, 1923.
V. E. RANDALL
CULINARY UTENSIL
Filed July 19, 1922
1,475,316
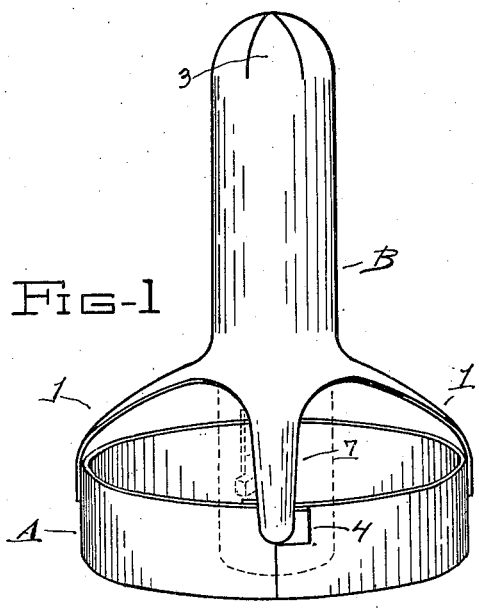
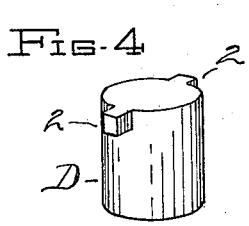
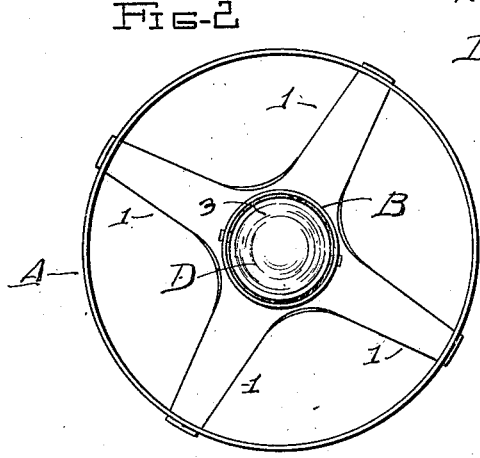
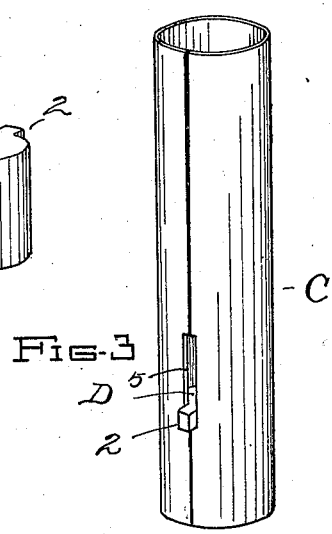
INVENTOR
Victor E. Randall Patented Nov. 27, 1923.

1,475,316

UNITED STATES PATENT OFFICE.

VICTOR E. RANDALL, OF BATTLE CREEK, MICHIGAN, ASSIGNOR TO WALTER S. CLEMENCE, OF BATTLE CREEK, MICHIGAN.

CULINARY UTENSIL.

Application filed July 19, 1922. Serial No. 576,132.

*To all whom it may concern:*

Be it known that I, VICTOR E. RANDALL, a citizen of the United States, residing at Battle Creek, in the county of Calhoun and State of Michigan, have invented certain new and useful Improvements in Culinary Utensils, of which the following description, taken in connection with the appended claims and accompanying drawings, forms a specification.

The present invention relates more particularly to a combination chopping knife and pastry cutter, the same being so constructed that by means of a detachable concentric center cutter carrying a stripping or expelling device pastry in the nature of cookies, doughnuts and fried cakes having central openings may be formed and the dough readily expelled from the central or hole-forming cutter without any special volition on the part of the operator.

The advantages of a central cutting device capable of expelling the severed dough that ordinarily accumulates in central cutters of a similar nature will be readily apparent.

An important object in the present device is to furnish a cutting blade of an enduring nature capable of use for chopping vegetables such as potatoes, cabbages, etc., in the making of various culinary products, and so forming the handle member that the same will be easy to grasp and use, and at the same time provide bracing members for the chopping blade that the same will not readily tilt and get out of alignment with its handle, and also afford a very rigid and convenient housing and socket for the inner detachable center cutting blade.

In the drawings forming a part of this specification, Figure 1 is a vertical elevation of my improved culinary utensil, the dotted lines showing the detachable center cutter or hole-forming blade.

Fig. 2 is an inverse view of the device.

Fig 3 is a perspective view of the center cutting blade and the expelling plunger in normal position therein.

Fig. 4 is a perspective view of an expelling plunger.

Like marks of reference refer to corresponding parts in the different views, in which A represents the circular main cutting blade; B, the handle electrically welded or otherwise attached to the blade at the extremities of the legs 1 curved to engage the upper edge of the blade, as shown; C, the detachable cylindrical open-ended center cutting blade; and D, the plunger or expelling weight having the guiding and retaining lugs 2 diametrically arranged at its upper end.

Preferably the handle member B is of seamless steel tubing of thin gauge formed by slitting the free end thereof into a series of cuniform ovate teeth 3, which when bent to meet at their edges will form a hemispherical ended handle, the opposite end preferably being slitted into four equal portions and cutting away a portion of the metal whereby tapering round-ended portions after having been properly shaped will form curved outstanding legs 4 adapted to be attached about the upper edge of the circular outer cutting blade A. The blade as shown is a strip of steel cut into at one of its ends to form a projecting ear 4 which when the blade portion abuts will allow said ear 4 to overlap the opposite end of said blade at which place a leg 1 of the handle is attached by a rivet or weld, as expedient, to secure the assemblage of parts intact.

The hole or center cutting blade C is a round tubular sheet formed from XX tin, of rectangular form, and it is provided with elongated slots 5 so shaped that when a plunger D is in operative position within the tubular blade, as shown, the lugs 2 of said plunger will protrude through the longitudinally-formed slots 5 at opposite points of said blade and prevent said plunger from dislodgment therewith. The plunger D when fitted within its blade is aligned at its lower end with the cutting edge of the enclosing blade for the purpose of ejecting any pastry dough that might have a tendency to lodge or remain within said blade when elevated in the operation of cutting doughnuts or the like, yet capable of moving upwardly within said blade when the latter is depressed in the manner of pastry cutting.

The tubular blade C opposite to the end from which the plunger D is placed may be slightly apart for a portion of its length to provide sufficient resiliency to prevent the blade from dislodgment from the socket or opening in the handle member B when the former is seated therein, yet permitting the same to be dislodged by pulling it from the handle portion. The arrangement of the parts is such that when the center blade C is in operative position within the handle member B, the cutting edges of the blades A and C will align on a common plane when the upper end of the latter engages the curve at the free end of the hemispherical end of said handle.

From the foregoing explanation taken in connection with the drawings, it is believed the operation, advantages and general utility of my improved culinary utensil will be fully comprehended.

Having, therefore, set forth my invention, what I claim as new and desire to secure by Letters Patent, is 1. In an article of the class set forth, the combination with a hollow handle member having a series of outspread downwardly extending legs, and a circular band blade attached at its upper edge to the free ends of said legs, of a concentric tubular blade slitted at its upper end and adapted to seat in said handle member, said tubular blade near its cutting end being formed with oppositely disposed vertical slots and a plunger carried within the lower end of said blade and having lugs adapted to extend through said slots and permit said plunger to be reciprocated in said cylindrical blade, as and for the purpose set forth.

2. In a device of the class set forth, the combination of a hole-cutting blade tubular in form and open at both ends, and a plunger or weight carried at the cutting end of said blade, said plunger adapted to lie coincident with the cutting edge of said blade normally and to be moved within said blade, the opposite end of said blade being slitted and forming a circular friction extension, substantially as set forth.

VICTOR E. RANDALL.

Witnesses:
H. H. BALDORFF,
C. E. SMITH.